E. I. DODDS.
STAYBOLT STRUCTURE.
APPLICATION FILED JAN. 20, 1920.
1,366,723.
Patented Jan. 25, 1921.
2 SHEETS—SHEET 2.
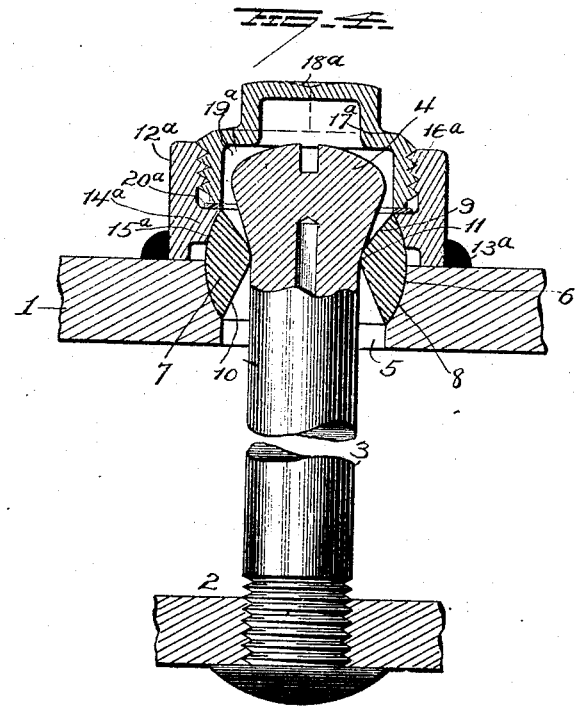
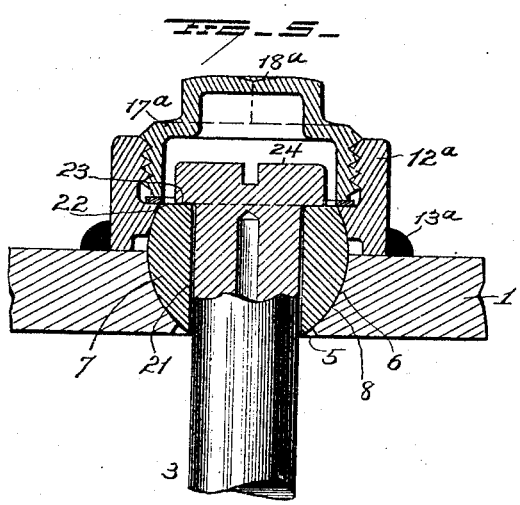
INVENTOR
E. I. Dodds
By Seymour & Bright
Attorneys

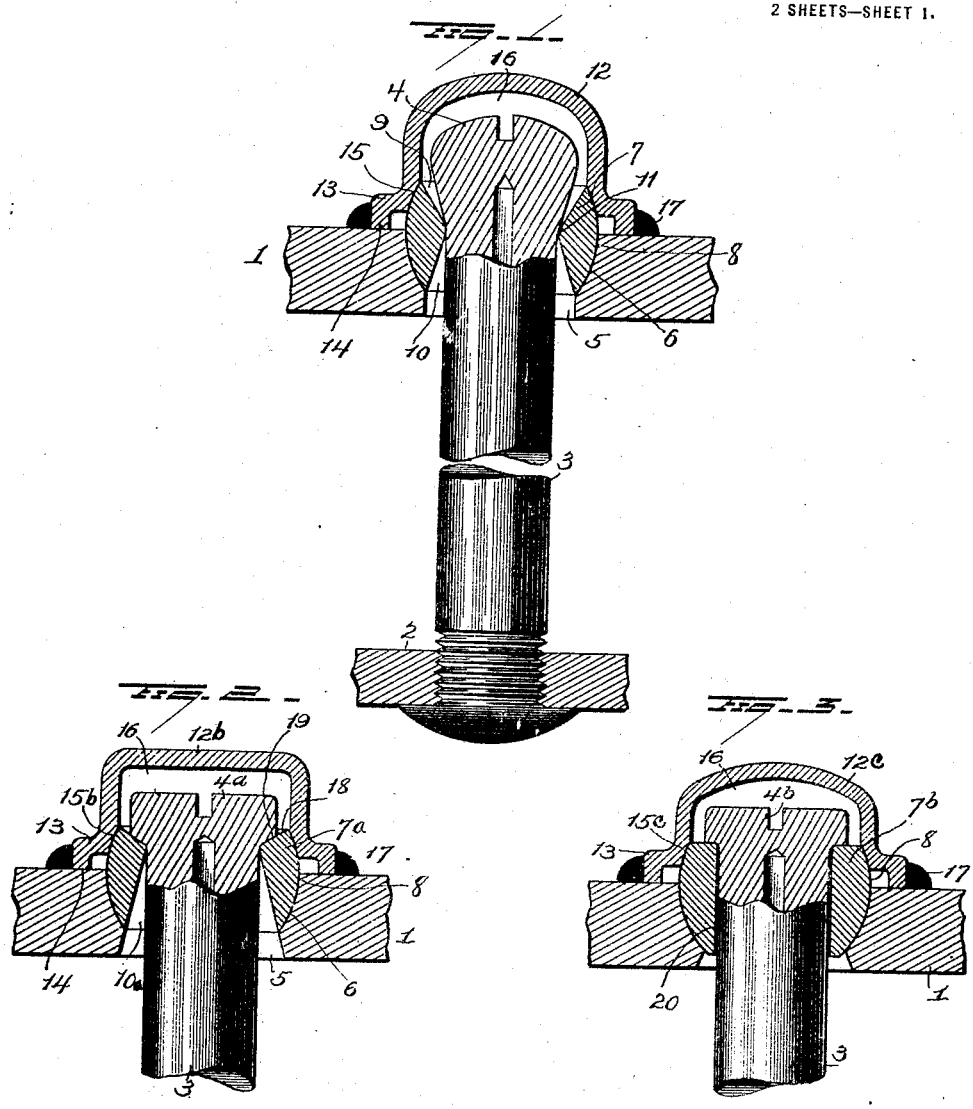

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

STAYBOLT STRUCTURE.

1,366,723.  Specification of Letters Patent.  Patented Jan. 25, 1921.

Application filed January 20, 1920. Serial No. 352,693.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Staybolt Structures; and I do hereby declare the following to be a full, clear, and exact description of the invention, such as will enable others skilled in the art to which it appertains to make and use the same.

This invention relates to improvements in staybolt structures for boilers,—one object of the invention being to provide simple means for mounting the outer end of a staybolt in a boiler sheet and inclosing the bolt head and the part which constitutes its bearing member, and to so construct and mount the bearing member and the closure member that said bearing member shall be seated on the boiler sheet and closure member and be capable of universal adjustment relatively to both.

A further object is to provide a universally movable or adjustable mounting for a staybolt, which shall be so constructed that a staybolt may be employed having a head which need not have a rounded or partly spherical portion where it engages the bearing member, thereby avoiding the necessity of providing a rounded seat in a bearing member for a rounded or partly spherical bolt head.

With these and other objects in view, the invention consists in certain novel features of construction and combinations of parts as hereinafter set forth and pointed out in the claims.

In the accompanying drawings, Figure 1 is a sectional view, partly in elevation showing an embodiment of my invention, and Figs. 2, 3, 4 and 5 are views of modified constructions.

1 represents the outer sheet of a boiler and 2, the inner sheet. A staybolt 3 is secured in any suitable manner to the inner boiler sheet and its headed or enlarged outer end portion 4 is connected with the outer boiler sheet as hereinafter described.

The outer boiler sheet 1 is provided with an opening 5, an inner portion of which may be cylindrical and have a diameter appreciably greater than the diameter of the staybolt and the remaining portion of said opening is made with a rounded wall to provide a rounded seat 6, on which an annular bearing member 7 has a universally movable mounting. The bearing member 7 is made with a rounded exterior face 8 conforming to the curvature of the seat 6 in the boiler sheet, and the interior of said annular bearing member is made with two tapering portions 9 and 10 extending from respective ends of said annular member and meeting intermediate of said ends, thus forming within the annular member, a ridge or shoulder 11 constituting a seat located intermediate the ends of said bearing member and which is engaged by the staybolt at the juncture of its headed portion with its body portion. In the construction shown in Fig. 1, the headed portion of the bolt is made tapering and engages the bearing member at or near the inner end of the taper.

The headed end of the bolt, as well as the projecting portion of the bearing member and the opening in the boiler sheet, are inclosed by a housing or closure 12 having an annular lateral flange 13 and an annular flange 14, the latter disposed to seat on the boiler sheet around and spaced from the opening therein. At or near the juncture of the flange 13 with the body of the housing or closure, an internal curved seat 15 is formed, against which the curved exterior portion 8 of the member 7 has a movable bearing, said seat 15 having a curvature conforming to the curvature of the exterior face of the bearing member and that of the seat 6 in the boiler sheet. The housing or closure 12 may, in the construction shown in Figs. 1, 2 and 3, be made in a single piece and of such configuration and dimensions as to provide adequate clearance space 16 for the bolt head.

The flange 14 around the edge portion of the housing or closure 12 is united to the outer boiler sheet by a weld 17.

It will be observed that the housing or closure provides an extended bearing at 15 for the bearing member and serves to hold the latter in place and prevent it from binding.

In the construction shown in Fig. 2, the housing or closure is made with a flat outer end portion instead of being rounded as shown in Fig. 1. In Fig. 2, the bearing member 7ᵃ is so tapered interiorly as to provide a beveled or slightly tapering seat 18 at its upper end for a beveled shoulder 19 formed by the bolt head 4ª, and with a tapering portion 10ª. A housing 12ᵇ is mounted on and welded to the boiler sheet and formed with a seat 15ᵇ against which the curved exterior of the member 7ª bears.

In Fig. 3, the bearing member 7ᵇ is made with a straight or cylindrical bore 20 through which the bolt 3 passes, and the latter is made with a head 4ᵇ, the inner portion of which is at right angles to the body of the bolt and rests upon the outer end of the bearing member 7ᵇ. The housing 12ᶜ which is welded to the boiler sheet, is made with a seat 15ᶜ against which the curved exterior of member 7ᵇ bears.

In the construction shown in Fig. 4, the housing or closure is made in two parts, comprising a ring 12ª which surrounds the opening in the outer boiler sheet and also the projecting portion of the bearing member and the enlarged or headed end of the bolt and is fixedly united to the outer boiler sheet by a weld 13ª, and a plug 17ª. The ring 12ª is provided interiorly with an annular flange 14ª having a rounded inner face 15ª, the curvature of which is the same as that of the exterior portion 8 of the bearing member 7 and constitutes an extended seat for the latter to hold it properly in place and prevent binding.

The ring 12ª is threaded interiorly as at 16ª for the reception of the plug 17ª, the latter having an angular portion 18ª to receive a wrench. The plug 17ª is made hollow and provides a clearance 19ª for the outer or headed end of the staybolt, and a gasket 20ª may be located between the inner end of said closure and the flange 14ª.

In the construction shown in Fig. 5, the rounded seat 6 in the boiler sheet may extend more nearly through the thickness of the sheet than shown in Fig. 1, and the bearing member 7ᶜ is made with a cylindrical bore 21 through which the staybolt 3 passes and the outer end of said bearing member is flattened to form a seat 22 on which a shoulder 23 formed by the head 24 of the staybolt is mounted. In other respects, the construction shown in Fig. 5 is similar to that shown in Fig. 4.

Having fully described my invention what I claim as new and desire to secure by Letters-Patent, is:—

1. In a staybolt structure, the combination with a boiler sheet having an opening, a closure secured to the boiler sheet around said opening, and a staybolt, of a bearing member having a rounded exterior portion movably mounted against the boiler sheet and said closure and affording a mounting for the staybolt.

2. In a staybolt structure, the combination with a boiler sheet having an opening, of an annular bearing member having a rounded exterior movably mounted in the opening in the boiler sheet, a staybolt passing through said bearing member and having an enlarged end whereby said staybolt is supported by the bearing member, a closure inclosing the outer end of the bearing member and the enlarged end of the bolt and welded to the boiler sheet, said closure having a seat therein for the rounded exterior portion of the bearing member.

3. In a staybolt structure, the combination with a boiler sheet having an opening, of an annular bearing member provided with a rounded exterior and having universally movable mounting in said opening, a staybolt passing through said bearing member and provided with a headed outer end having a movable connection with said bearing member, and means for housing the headed end of the staybolt and the bearing member.

4. In a staybolt structure, the combination with a boiler sheet having an opening, of an annular bearing member having a universally movable mounting in said opening, said bearing member having a seat for a headed staybolt, a headed staybolt passing through said bearing member and movably mounted on said seat, and a closure welded to the boiler sheet around the opening therein and provided with a seat against which the curved exterior of the bearing member has movable engagement.

5. In a staybolt structure, the combination with a boiler sheet having an opening, of an annular bearing member having universally movable mounting in said opening, said bearing member having a ridge therein between its ends forming a seat; a staybolt passing through said bearing member and having a headed end, said stay bolt movably engaging the seat in the bearing member adjacent to the inner end of said headed end, and a closure welded to the boiler sheet and having a seat for the rounded exterior of the annular bearing member.

6. In a staybolt structure, the combination with a boiler sheet having an opening, of an annular bearing member having universally movable mounting in said opening and having a seat, a staybolt passing through said bearing member and having an enlarged end mounted on the seat of said bearing member, a two-part closure comprising a housing ring surrounding the opening in the boiler sheet, the projecting portion of the bearing member and the enlarged end of the bolt and welded to the boiler sheet, said housing ring having an internal flange constituting an extended seat for the exterior portion of the bearing member and means removably secured to said housing ring and closing the same.

7. In a staybolt structure, the combination with a boiler sheet provided with an opening having a rounded wall, of an annular bearing member having an exterior rounded portion universally movable on the rounded wall of the opening in the boiler sheet and having a seat, a staybolt passing through said bearing member and having an enlarged end mounted on the seat of said bearing member, a two-part closure comprising a housing ring welded to the boiler sheet and having an internal flange affording an extended bearing for the rounded exterior portion of the bearing member and a removable member closing said housing ring.

In testimony whereof I have signed this specification.

ETHAN I. DODDS.